G. D. AVERY.
3051X
Plow.
Patented Dec. 28, 1818.
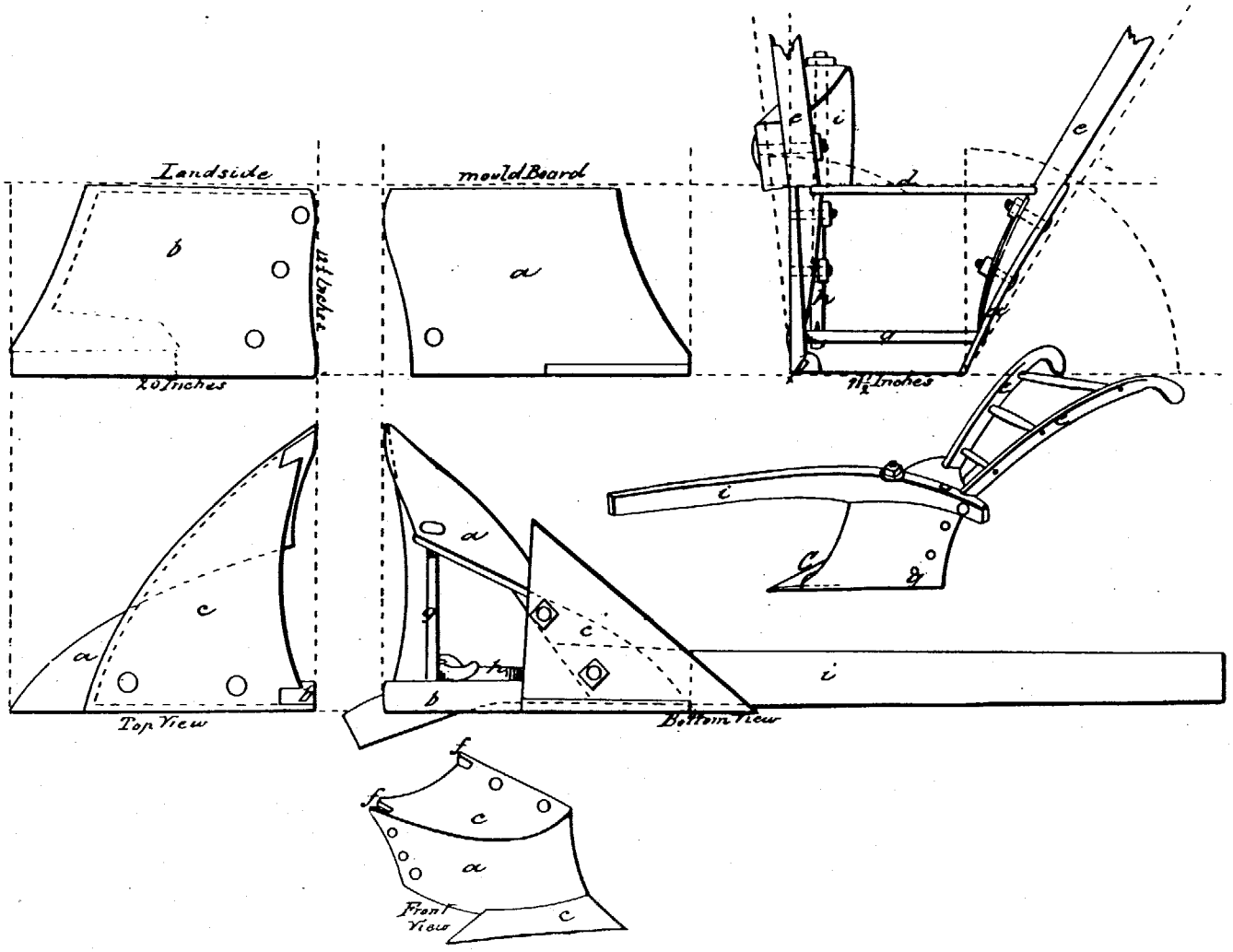
H. PETERS, PHOTO-LITHOGRAPHER, WASHINGTON, D. C.

3051X

UNITED STATES PATENT OFFICE.

GEORGE D. AVERY.

IMPROVEMENT IN PLOWS.

Specification forming part of Letters Patent dated December 28, 1818.

*To all whom it may concern:*

Be it known that I, GEORGE D. AVERY, have invented an Improvement in Plows, of which the following is a specification.

The body of the plow is of cast-iron, formed of the mold-board, landside, and top, cast together in one entire piece about twenty inches long from the point of the mold-board to the hind end of the lower edge of the landside, eleven and one-half inches wide across the bottom at the hind end, ten inches wide at the hind end of the share, twelve and one-half inches high, extending from the bottom of the plow up to the beam, eighteen inches long on the top, and eighteen and three-fourths inches wide on the top at the hind end. The hind end of the top may be as high as the upper fore corner, and the top lie horizontally; or it may be lower and the top lie slanting. The use of connecting the mold-board, landside, and top in the casting in one entire piece is that it gives great additional strength to the parts connected and secures them permanently in their proper position relative to each other, wherefore this plow is not liable to work worse, as other plows are, by being put out of shape by using or repairing.

To make a pattern to cast the body, first make a block of the size and shape you want the body. Then make the pattern to fit into the block, the landside, and top of boards, and the mold-board of staves glued together and neatly smoothed.

The body of the plow, before specified, together with its use and connection with other parts of the plow, I claim as my invention and improvement.

The mold-board is connected in the casting with the landside from its point to the beam. It is also connected in the casting with the top the whole length of its upper edge. On its under side there is an offset extending from the landside at six inches back of the point diagonally backward seven and one-half inches, forming an angle with the landside at fifty-two degrees. This offset or sudden increase of thickness is to make that part through which the share-bolts pass sufficiently strong, it being about one and five-eighths inch thick from the offset forward to the edge of the mold-board and landside, and as far back as the share extends is a plane, which lies on the share; and here is a space left in the casting, into which the share is to be fitted, which extends from the point of the mold-board back on the landside ten and three-fourths inches, and from thence across the bottom to cut the lower edge of the mold-board at a right angle with the landside. This space is one and three-fourths inch deep at the hind end of the share on the landside, one and one-half inch deep at the point of the mold-board, and three-fourths of an inch deep in the mold-board. The share bolt-holes are one inch square on the upper side and tapered to three-fourths of an inch and round on the under side. One is two and five-eighths inches from the outside of the landside and three and one-fourth inches from the edge of the mold-board. The other is six inches from the outside of the landside and three inches from the edge of the mold-board. The lower edge of the mold-board does not extend as far back as the landside by two inches. The slope of the hind end forms an angle with the line of the lower edge of about forty-two degrees, which gives the slope of the handles. The lower fore edge of the mold-board forms an angle with the landside of about forty-five degrees.

The improvement of the mold-board, before specified, together with its use and connection with other parts of the plow, I also claim as my invention and improvement.

The landside extends in one plate from the bottom of the plow up to the beam, and from the fore end of the mold-board to the hind end of the plow it is about three-eighths of an inch thick at the upper edge, increasing in thickness toward the lower edge, and at the lower edge, on the inside, there is a beveled offset, making it one inch thick. The landside is connected in the casting with the mold-board from its fore corner up to the beam, and it is also connected in the casting with the top from its upper fore corner back to the notch which is left in the top for the beam-handle. The landside, being a plane of hard metal, (the lower edge of which may be set a little out to land,) will wear smooth, and its extending to the top effectually prevents anything from sticking to or clogging that part of the plow. The landside standing edgewise directly under the beam and fore part of the mold-board, where the greatest stress comes, it is a firm supporter of that part of the plow. The beam-handle being secured to the landside by two screw-bolts, which pass through the landside near its hind end, is kept in its proper place, and, being thus connected, the landside and handle are mutual supporters of each other.

The landside, before specified, together with its use and connection with other parts of the plow, I also claim as my invention and improvement.

The top is about three eighths of an inch thick and lies between the upper edges of the mold-board and landside, and, being connected with them in casting, it gives the necessary support to those two important parts. It also supports the handles, they being let into it in two notches in the hind end. The notch for the beam-handle is adjoining the landside, the notch for the mold-board handle is two and one half inches from the hind corner of the mold-board. The top also supports the beam, which lies upon it, and the main and brace bolts, which go up through it. The hole for the main bolt is two and three-fourths inches from the fore corner, and two inches from the landside, and is seven-eighths of an inch diameter. The hole for the brace-bolt is five and one-fourth inches from the upper hind corner of the landside and one and three-fourths inch from the landside, and is five-eighths of an inch diameter.

The top, before specified, together with its use and connection with other parts of the plow, I also claim as my invention and improvement.

The brace-bar is of iron, about one inch square. It goes through the landside and mold-board two and one-half inches above their lower edges and in the proper place to receive the hook on the lower end of the main bolt. The use of the brace-bar is to brace between the mold-board and landside, and to secure the body of the plow to the beam by its connection with the main bolt.

The brace-bar, before specified, together with its use and connection with other parts of the plow, I also claim as my invention and improvement.

The share is about three-eighths of an inch thick in the wing, fifteen inches long, and thirteen inches wide in the hind end, which forms a right angle with the landside. The edge may be straight and a little circular, and the point and edge are laid with steel. The landside of the share is welded on its under side and is of proper thickness to fit the space left for the share in the mold-board. The share is secured to the mold-board by two screw-bolts, which are fitted into the holes made for them in the mold-board and pass through the share, and are secured with screws on the under side, which, with the wrench on the upper end of the clevis-pin, may be screwed off at pleasure to repair the share.

The share, before specified, together with its use and connection with other parts of the plow, I also claim as my invention and improvement.

The main and brace bolts are wrought-iron. The main bolt is seven-eighths of an inch in diameter. Its lower end is bent in form of a hook to fit the brace-bar, on which it is hooked, the hook standing forward from the brace-bar. The bolt extends upper pendicularly through the hole left for that purpose in the top and through the beam. The brace-bolt is five-eighths of an inch in diameter and goes slanting up through the handle through the holes made for it in the top and through the beam. Both bolts have strong screws on their upper ends, by which they secure the beam to the body of the plow.

The manner of securing the beam to the body of the plow, before specified and described, I also claim as my invention and improvement.

The beam is about five feet three inches long, three by four inches thick at the fore end, and about eight by four inches at the main bolt. From the main bolt to the handle it is cut on the upper side to fit the nut of the brace-bolt. From the offset left for the nut of the brace-bolt it is tapered in a curve to four and one-half inches at the handle. From the main bolt to the handle on the landside it is in a spiral form, overjetting the landside to fit the beam-handle, which slants over the landside about six degrees from the perpendicular to bring the plowman into his proper place. The beam is cut out on its under side about three inches deep, commencing at and directly over the upper fore corner of the mold-board, so as to form a curve in that part of the beam to correspond with the curve in that part of the mold-board which is immediately below it. This cut in the beam is deepest near its commencement, and tapers to nothing at the clevis. The use of the space embraced by the corresponding curves of the upper fore edge of the mold-board and under side of the beam is to prevent the plow from choking, which is effected by this part being curved, so as to give the proper shape and room for whatever might choke it to pass off and be turned into the furrow, where it will enrich the ground.

The beam, before specified, together with its use and connection with other parts of the plow, I also claim as my invention and improvement.

As different kinds of soil require plows of different shapes, particularly in the degree of elevation of the angle of the inclined curved plane of the fore part of the mold-board necessary to turn the furrow, it appears very difficult, if not impossible, to give any one form of the plow that would be the best that could be given to suit each particular kind of soil.

The shape of the plow, before described, is intended, as near as practicable, to suit soils in general use; but it may easily be varied to suit any particular kinds of soil.

GEORGE D. AVERY.

Witnesses:

GEORGE HADFIELD,

WM. ELLIOT.